April 25, 1933.　　　A. S. MARTHENS　　　1,905,238
CONTROL SYSTEM
Filed March 27, 1931
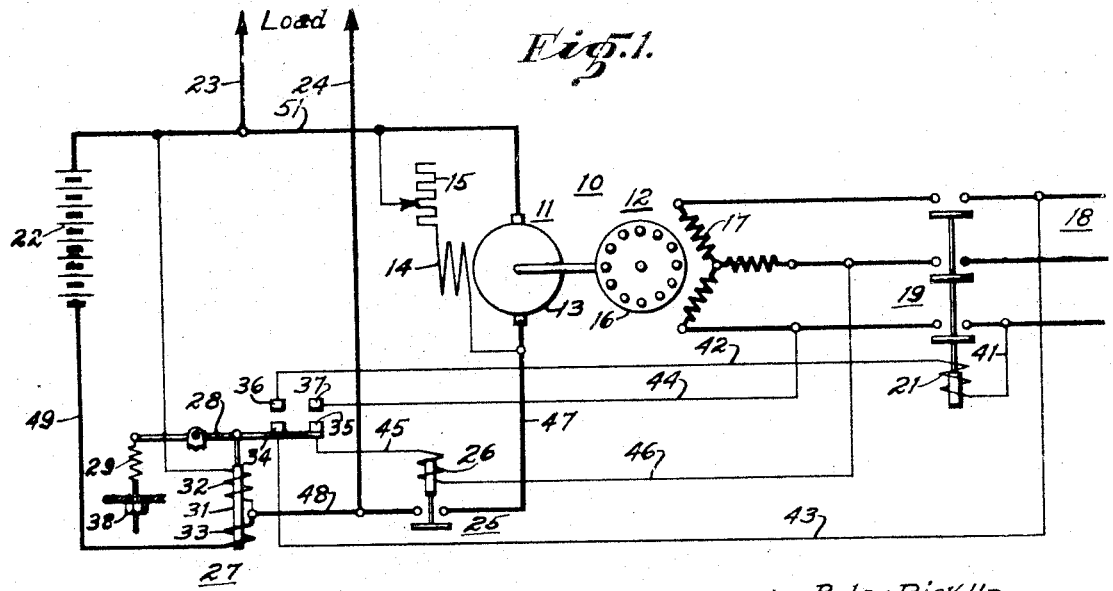
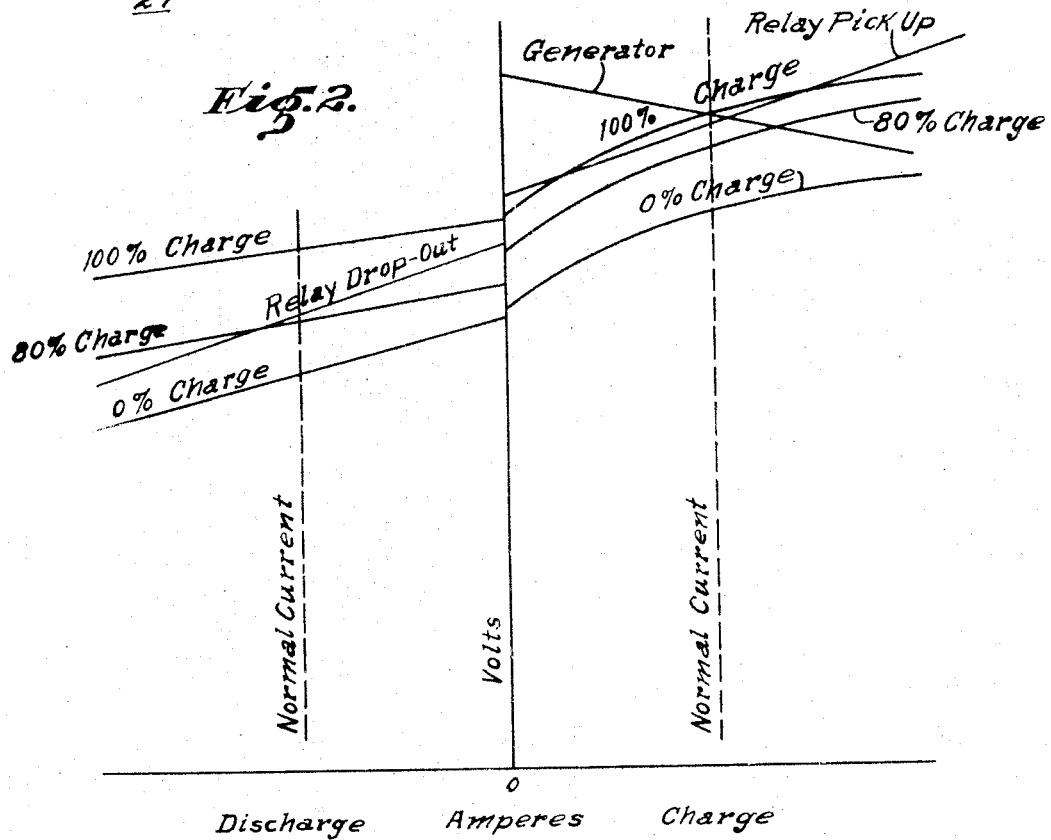
INVENTOR
Arthur S. Marthens.
BY
Wesley G. Carr
ATTORNEY
WITNESSES:

Patented Apr. 25, 1933

1,905,238

UNITED STATES PATENT OFFICE

ARTHUR S. MARTHENS, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed March 27, 1931. Serial No. 525,730.

My invention relates to control systems and more particularly to systems for controlling the charging of storage batteries, especially, batteries of the well known "Edison" type.

Various schemes have been tried for automatically controlling the charging of storage batteries, one of the most common being the use of an ampere hour meter, which measures the current flowing into and out of the battery and starts and stops the charging of the battery when a predetermined quantity of energy, based on ampere hours of discharge or charging current, has passed out of or into the battery. However, it has been learned that, as a battery becomes less efficient through use, the utilization of an ampere hour meter is not a satisfactory means of regulating the charging of a battery, since, as the efficiency of a battery decreases, the ratio of "input" to "output" changes and, therefore, the ampere hour meter does not register the actual condition of charge of the battery.

An object of my invention, generally stated, is to provide a control system for charging storage batteries which shall be reliable and efficient in operation and which may be economically manufactured and installed.

A more specific object of my invention is to provide for automatically controlling the charging of a storage battery in accordance with the terminal voltage and the current of the battery.

Other objects of my invention will be explained fully hereinafter or will be apparent to those skilled in the art.

According to my invention, the drop in the terminal voltage of a battery as it becomes discharged is utilized to control the charging of a storage battery which may be of either the "Edison" or the lead-plate type. A relay which is responsive to the terminal voltage and the current of a battery is provided to control the means utilized for charging the battery.

For a fuller understanding of the nature and scope of my invention, reference may be had to the following detailed description, taken in conjunction with the accompanying drawing, in which:

Figure 1 is a diagrammatic view of a control system embodying the principal features of my invention;

Fig. 2 is a view showing curves which illustrate the operating characteristics of a storage battery of the "Edison" type.

Referring to the drawing, 10 designates a motor-generator set which comprises a direct-current generator 11 that is driven by an alternating-current motor 12. The generator 11 is provided with an armature winding 13 and a shunt field winding 14. A variable resistor 15 is provided for regulating the amount of current permitted to flow in the field winding 14. In this instance the motor 12 is of the three-phase, induction type having a rotor winding 16 and a stator winding 17, but a motor of any suitable type may be utilized for driving the generator 11.

The stator winding 17, of the motor 12, may be connected to power conductors 18 by an electrically-operated starting switch 19 that is actuated by a coil 21. The switch 19 is so constructed that its contact members are closed when the coil 21 is energized. When the contact members of the switch 19 are closed, the motor 12 is connected to a suitable power source (not shown) through the power conductors 18.

A storage battery 22, which is preferably of the "Edison" type although a lead-plate battery may be utilized, is connected to a load circuit (not shown) by means of the conductors 23 and 24. An electrically-operated switch 25, having an actuating coil 26, is provided for connecting the generator 11 to the battery 22 to charge the battery.

As shown by the curves in Fig. 2, which are voltage regulation curves of a storage battery of the "Edison" type, the terminal voltage of a battery of this type is proportional to the condition of charge of the battery and to the current flowing out of the battery during discharge or into the battery during charge. The curves on the left of the zero axis show the conditions when the battery is being discharged and the curves on the right of the zero axis show the conditions when the battery is being charged.

In order that the condition of charge of the battery may be automatically controlled, a relay 27, that is responsive to the terminal voltage and to the battery current, is provided to control the switches 25 and 19 which respectively connect the generator 11 to the battery and the motor 12 to the power source.

The relay 27 comprises a pivotally-mounted armature 28 that is disposed to be actuated in one direction by a spring 29 and in the opposite direction by an electro-magnetic core 31 which is energized by two coils 32 and 33. The coil 32 is a shunt coil and is connected across the terminals of the battery 22, thereby being energized in accordance with the terminal voltage of the battery. The coil 33 is connected in series with the battery 22 and is therefore energized in accordance with the battery current. The coils 32 and 33 are so connected that the flux produced by the series coil 33 opposes the flux produced by the shunt coil 32 when the battery is being charged and aids the shunt coil when the battery is being discharged.

The relay 27 is provided with movable contact members 34 and 35 mounted upon the armature 28 and disposed to engage fixed contact members 36 and 37, respectively, when the pull of the spring 29 exceeds the force of the flux produced by the coils 32 and 33. The tension, and consequently, the pulling force of the spring 29 may be varied by adjusting the nut 38 thereby changing the "setting" of the relay, that is, the voltage which must be applied to the relay coils to overcome the force exerted by the spring.

Since, as previously explained, the terminal voltage of the battery 22 is proportional to both the current flowing through the battery and the condition of charge of the battery, the relay 27, which is responsive to the voltage and the current of the battery, may be utilized to automatically control the condition of charge at which the battery is maintained.

Assuming that the battery 22 is supplying electrical energy to a load through the conductors 23 and 24, the battery will gradually become discharged and its terminal voltage will be lowered, as shown by the discharge curves in Fig. 2. When the terminal voltage of the battery is lowered to a point on the "relay drop-out" curve, which indicates the voltage and current values at which the force exerted by the spring 29 of the relay 27 is sufficient to overcome the magnetic pull of the relay coils 32 and 33, the contact members of the relay are closed. The closing of the contact members establishes circuits through the actuating coils of the switches 19 and 25 which cause these switches to be closed to connect the motor 12 to the power conductors 18 and the generator 11 to the battery 22.

The circuit thus established for the actuating coil 21 of the switch 19 may be traced from one of the three-phase power conductors 18, through conductor 41, the actuating coil 21, conductor 42, contact members 36 and 34 of the relay 27 and conductor 43 to another of the three-phase power conductors 18, thereby connecting the coil 21 across one phase of the power source. The closing of the switch 19 applies voltage to the stator winding 17 of the motor 12, thereby starting the motor.

After the contact members of the switch 19 are closed, the actuating coil 26 of the switch 25 is connected across one phase of the power source through conductor 44, contact members 37 and 35 of the relay 27, conductor 45, coil 26 and conductor 46. When the coil 26 is energized, the switch 25 is closed to connect the generator 11 to the battery 22 to charge the battery. The circuit through the battery extends from one terminal of the armature 13, through conductor 47, contact members of the switch 25, conductor 48, the series coil 33 of the relay 27, conductor 49, battery 22 and the conductor 51 to the opposite terminal of the armature 13.

Since the actuating coil 26 of the switch 25 cannot be energized until voltage is applied to the motor 12, by the closing of the switch 19, the generator 11 cannot be connected to the battery 22 before power is supplied to the motor 12 thereby preventing the battery 22 from supplying energy to operate the generator 11 as a motor to drive the motor 12. Furthermore, the generator 11 is prevented from acting as a motor in case of failure of the alternating-current power source to which the motor 12 is connected, since the actuating coil 26 becomes deenergized in case of failure of the alternating current power, thereby permitting the switch 25 to open its contact members to disconnect the generator 11 from the battery.

As shown by the curves on the right-hand side of the zero axis in Fig. 2, the terminal voltage of the battery increases as the charging current and the condition of charge of the battery increase. As is also shown by the "generator" curve in Fig. 2, the characteristics of the generator 11 are such that the terminal voltage of the generator decreases as the charging current supplied to the battery increases. Therefore, as the condition of charge of the battery is raised, its terminal voltage increases and the voltage of the generator must rise in order to force a charging current through the battery. When the terminal voltage of the battery and the generator voltage increase to a point on the "relay pick-up" curve, which indicates the values of voltage and current at which the flux produced by the coils 32 and 33 of the relay 27 overcomes the pull of the spring 29, the contact members of the relay are opened. The opening of the contact members of the relay 27 deenergizes the actuating coils of the switches 19 and 25, thereby disconnecting the motor 12 from the power source and the generator 11 from the battery 22.

As previously explained, the "setting" of the relay 27 may be varied by adjusting the tension of the spring 29 and the air-gap of the relay. In this manner the relay "drop-out" curve and the relay "pick-up" curve may be raised or lowered with reference to the curves showing the condition of charge of the battery, thereby regulating the condition of charge at which the battery will be maintained. If it is desired to increase the charge of the battery, the relay may be set to operate at a higher terminal voltage and if it is desired to lower the charge of the battery, the relay may be so adjusted as to respond to a lower voltage.

As will be readily understood, a relay of the type herein described may be adjusted to suit the operating characteristics of a storage battery of any type by changing the ratio of the ampere turns of the series coil 33 to the shunt coil 32, thereby changing the slope of the relay "drop-out" and relay "pick-up" curves. As shown in Fig. 2, the relay is so adjusted that the "pick-up" curve practically coincides with the curve illustrating the battery characteristics at 100% charge. The relay 27 will therefore control the operation of the generator 11 to maintain the battery in practically a fully charged condition and will also prevent the battery from becoming overcharged.

It will be evident from the foregoing description that I have provided a system for automatically charging a storage battery which is simple and efficient in operation and which will more definitely maintain a battery in a predetermined condition of charge than any previously known system.

I do not desire to be restricted to the specific embodiment of my invention herein shown and described since it is evident that it may be changed and modified without departing from the spirit and scope of my invention as defined in the appended claims.

I claim as my invention:

1. In a battery-charging control system, in combination, a storage battery, a source of electrical energy for charging the battery, switching means for connecting the charging source to the battery, and unitary means responsive to the terminal voltage and the charging current of the battery for controlling the switching means to cause the battery to be disconnected from the charging source when the battery is in a predetermined condition of charge.

2. In a battery-charging control system, in combination, a storage battery, a source of electrical energy for charging the battery, switching means for connecting the charging source to the battery, a load circuit disposed to be connected to the battery, and unitary means responsive to the terminal voltage and the discharge current of the battery for controlling the switching means to cause the battery to be connected to the charging source when the battery is in a predetermined condition of charge.

3. In a battery-charging control system, in combination, a storage battery, a generator for charging the battery, a motor for driving the generator, a source of power for the motor, switching means for connecting the generator to the battery, and unitary means responsive to the terminal voltage and the charging current of the battery for controlling the switching means to disconnect the battery from the generator when the battery is in a predetermined condition of charge.

4. In a battery-charging control system, in combination, a storage battery, a generator for charging the battery, a motor for driving the generator, a source of power for the motor, switching means for connecting the generator to the battery, a load circuit disposed to be connected to the battery to cause the battery to be discharged, and unitary means responsive to the terminal voltage and the discharge current of the battery for controlling the switching means to connect the battery to the generator when the battery is in a predetermined condition of charge.

5. In a battery-charging control system, in combination, a storage battery, a generator for charging the battery, a motor for driving the generator, a source of power for the motor, switching means for connecting the motor to the source of power, switching means for connecting the generator to the battery to charge the battery, and unitary means responsive to the terminal voltage and the charging current of the battery for controlling the switching means to disconnect the battery from the generator and the motor from the power source when the battery is in a predetermined condition of charge.

6. In a battery-charging control system, in combination, a storage battery, a generator for charging the battery, a motor for driving the generator a source of power for the motor, switching means for connecting the motor to the source of power, switching means for connecting the generator to the battery, a load circuit disposed to be connected to the battery to cause the battery to be discharged, and unitary means responsive to the terminal voltage and the discharge current of the battery for controlling the switching means to connect the battery to the generator and the motor to the power source when the battery is in a predetermined condition of charge.

7. In a battery-charging control system, in combination, a storage battery, a generator for charging the battery, a motor for driving the generator, a source of power for the motor, switching means for connecting the generator to the battery to charge the battery, said switching means being disposed to disconnect the generator from the battery in case of failure of the source of power for the motor, and unitary means responsive to the terminal voltage and the charging current of the battery for controlling the switching means to disconnect the battery from the generator when the battery is in a predetermined condition of charge.

8. In a battery-charging control system, in combination, a storage battery, a generator for charging the battery, switching means for connecting the generator to the battery, a motor for driving the generator, a source of power for the motor, switching means for connecting the motor to the source of power, and unitary means responsive to the terminal voltage and the current of the battery for controlling the switching means to connect the battery to the generator and the motor to the power source when the battery is in a predetermined condition of charge, said switching means being disposed to connect the motor to the power source before the battery is connected to the generator.

9. In a battery-charging control system, in combination, a storage battery, a generator for charging the battery, a load-circuit connected to the battery, switching means for connecting the generator to the battery, and unitary means responsive to the terminal voltage and the current of the battery for controlling the switching means to cause the generator to be disconnected from or connected to the battery when the condition of charge of the battery varies over a predetermined range.

10. In a battery-charging control system, in combination, a storage battery, a source of electrical energy for charging the battery, a relay responsive to the terminal voltage and the current of the battery for automatically controlling the charging of the battery, means for adjusting said relay to vary the condition of charge at which the battery will be maintained and switching means controlled by said relay to cause the battery to be disconnected from or connected to the charging source when the condition of charge of the battery varies over a predetermined range.

In testimony whereof, I have hereunto subscribed my name this 13th day of March 1931.

ARTHUR S. MARTHENS.